3,149,656
VARIABLE, RENEWABLE AND REPLACEABLE TREAD PNEUMATIC TIRE ASSEMBLIES
Henley Barnett Johnson, 4509 Argyle Terrace NW., Washington 11, D.C.
Filed Sept. 15, 1961, Ser. No. 140,629
2 Claims. (Cl. 152—176)

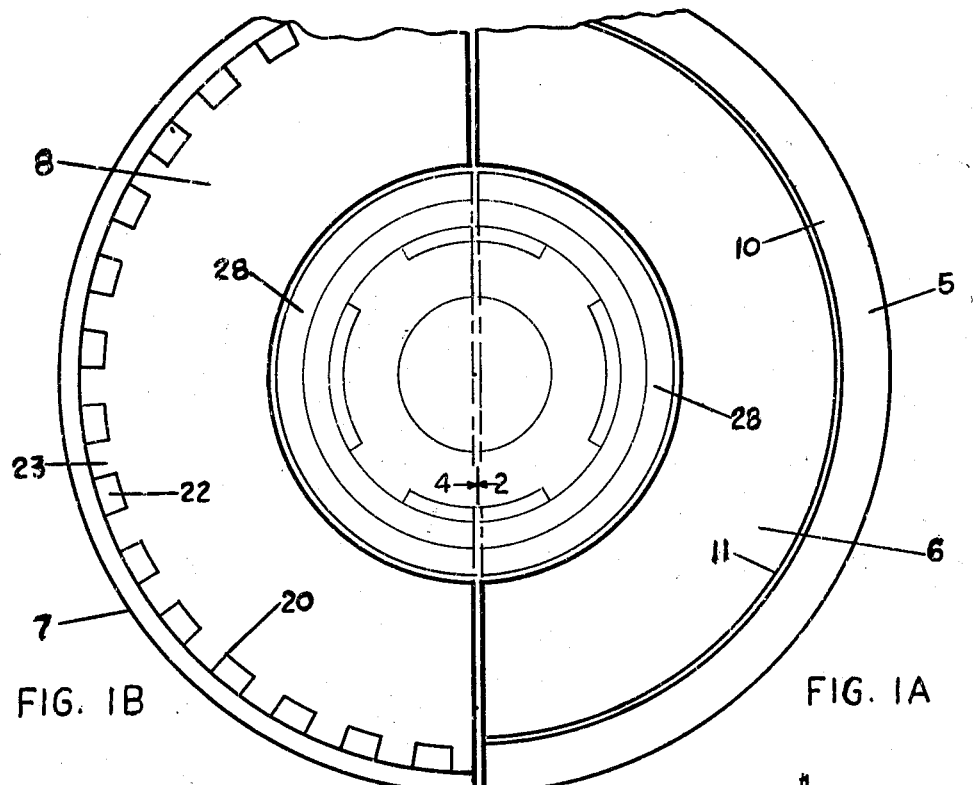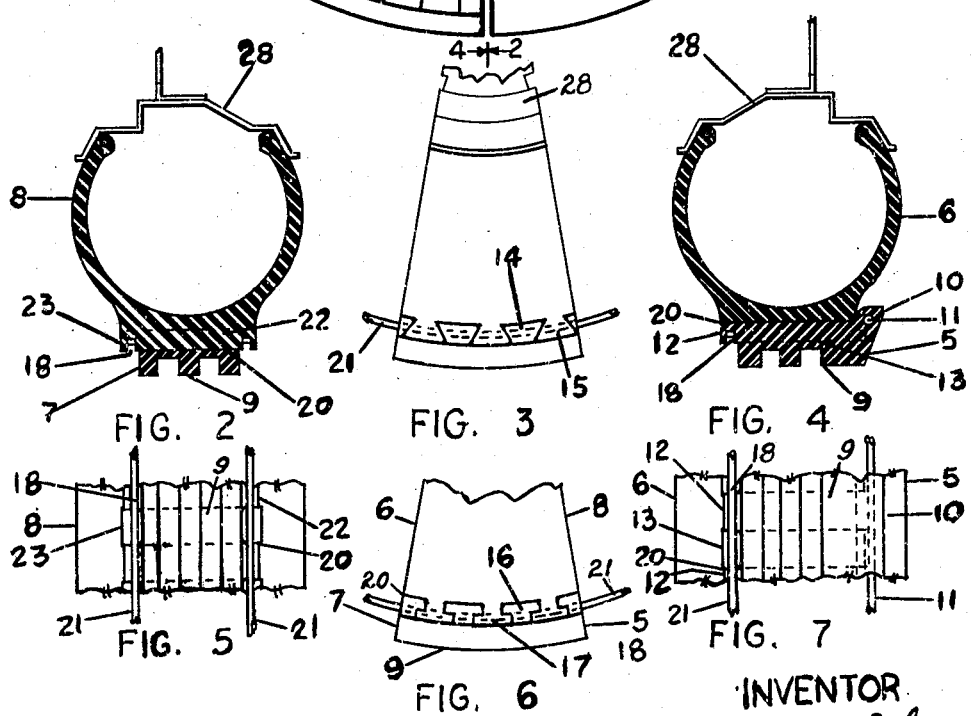

This application relates to all types and kinds of pneumatic tires and describes pneumatic tire assemblies of which each type and kind of assembly is of readily assemblable and disassemblable construction and comprises a complete pneumatic tire of conventional configuration composed of a pneumatic tire body component and one or more annular continuous anti-skid, traction and wearing tread components intimately attached, connected and locked to each other and to the outer circumference of the pneumatic tire body component so that they are readily variable, renewable and replaceable without deflating or distorting the pneumatic tire body component, while the pneumatic tire body component is inflated and mounted on the rim of a motor vehicle wheel, and while the wheel on which the pneumatic tire body component is inflated and mounted remains attached, connected and locked to the wheel drum and axle assembly of the vehicle on which it serves.

The present invention relates generally to the features whereby the pneumatic tire body and the anti-skid, traction and wearing tread material of a conventional pneumatic tire are made readily separable thereby protecting the pneumatic tire body from necessary damage required in retreading, and preserving such qualities as its ability to hold air while tubeless and puncture-sealing ability found in some expensive premium tires. The separable anti-skid, traction and wearing tread material is quickly and easily variable for special use, renewable when worn out, and replaceable. The need to retread or vulcanize new material to the pneumatic tire body is eliminated. The pneumatic tire body as a separate component of these pneumatic tire assemblies can be made air-tight, puncture-sealing, blow-out proof, and almost as permanent a part of the vehicle on which it serves as the wheel itself when constructed of new durable synthetic rubbers and rubber-like materials over fabrics of tough synthetic materials or longer lasting fiber glass or steel wire fabrics.

The present invention relates particularly to the quick, easy and almost effortless variability, renewability and replaceability of the anti-skid, traction and wearing tread components of these pneumatic tire assemblies, and the readily assemblable and disassemblable construction features and arrangements which make this possible. Inherent and indispensable features of the readily assemblable and disassemblable construction of these pneumatic tire assemblies are already held by Letters Patent of the United States, Nos. 2,875,807 (withdrawn March 3, 1959) and 2,957,509 (issued October 25, 1960), however, the present disclosures are new, novel and constitute useful improvements and additional invention in that the variable, renewable and replaceable anti-skid, traction and wearing tread components of these pneumatic tire assemblies are applicable to and removable from the pneumatic tire body component not only without deflating or distorting the pneumatic tire body component and while the pneumatic tire body component is inflated and mounted on the rim of a motor vehicle wheel, but also while the wheel on which the pneumatic tire body component is inflated and mounted remains attached, connected and locked to the wheel drum and axle assembly of the vehicle on which it serves; and the improved construction which allows the annular continuous anti-skid, traction and wearing tread components to be applicable to and removable from the pneumatic tire body component of these pneumatic tire assemblies by one lateral motion which thereby allows the interdigitating projections of the two or more components which mesh over those attaching interfaces between the annular continuous anti-skid, traction and wearing tread components and the pneumatic tire body component to be arranged in an interlocking manner. These new, novel and inventive features are effected by arranging the anti-skid, traction and wearing tread components of these pneumatic tire assemblies as continuous annular rings positioned concentrically over the flat outer surface of the pneumatic tire body component by one lateral motion which makes it possible to assemble and disassemble the components of these pneumatic tire assemblies without deflating or distorting the pneumatic tire body component, while the pneumatic tire body component is inflated and mounted on the rim of a motor vehicle wheel, and while the wheel on which the pneumatic tire body component is inflated and mounted remains attached, connected and locked to the wheel drum and axle assembly of the vehicle on which it serves.

The object of the present invention is to provide all types and kinds of pneumatic tire assemblies of which each type and kind of pneumatic tire assembly is of readily assemblable and disassemblable construction and comprises a complete pneumatic tire of conventional configuration composed of a pneumatic tire body component and one or more annular continuous anti-skid, traction and wearing tread components which are applicable in an attached, connected and locked condition to and removable after being unlocked in a free uncomplicated manner by one lateral motion from the pneumatic tire body component without deflating or distorting the pneumatic tire body component, while the pneumatic tire body component is inflated and mounted on the rim of a motor vehicle wheel, and while the wheel on which the pneumatic tire body component is inflated and mounted remains attached, connected and locked to the wheel drum and axle assembly of the vehicle on which it serves.

One specific object of the present invention is to provide all types and kinds of pneumatic tire assemblies of which each type and kind of pneumatic tire assembly is of readily assemblable and disassemblable construction and comprises a complete pneumatic tire of conventional configuration which is composed of a pneumatic tire body component and one or more annular continuous anti-skid, traction and wearing tread components intimately attached, connected and locked to its outer circumference, and to each other. The plurality of dividing interfaces along which the anti-skid, traction and wearing tread components are attached, connected and locked to the pneumatic tire body component of these pneumatic tire assemblies, and to each other, are interfaces with straight or variously shaped interlocking projections that are an integral part of said interfaces spaced appropriately approximately one or more projection widths apart along said interfaces. The pneumatic tire body component of these pneumatic tire assemblies is constructed so that in its inflated condition its outer circumference and the projections made integral therewith are nearly flat or parallel with its axis of rotation. Each annular continuous anti-skid, traction and wearing tread component of these pneumatic tire assemblies is constructed so that its inner circumference and the projections made integral therewith are nearly flat or parallel with its axis of rotation. Each of the projections made integral with the components of these pneumatic tire assemblies is suitably slotted on its outer surface one or more times to a sufficient depth whereby equal, matching and/or alternate projections of any one of the several components and sets of opposing interfaces mesh by the one lateral motion which positions the pneumatic tire body component inside the anti-skid, traction and wearing tread component with their various projections interdigitating along the extent of said opposing interfaces. Each slot in each projection is so designed that when this occurs the slots in the projections of the particular set of said opposing interfaces line up and form a long slot or groove along the extent of each set of said opposing interfaces. Into each of these long grooves a flexible cable can be drawn and detachably anchored or stretched and allowed to retract into the groove under its own tension thus attaching, connecting and locking the annular continuous anti-skid, traction and wearing tread components to the pneumatic tire body component of these pneumatic tire assemblies without deflating or distorting the pneumatic tire body, while the pneumatic tire body is inflated and mounted on the rim of a motor vehicle wheel, and while the wheel on which the pneumatic tire body is inflated and mounted remains attached, connected and locked to the wheel drum and axle assembly of the vehicle on which it serves.

Another specific object of the present invention is to provide all types and kinds of pneumatic tire assemblies of which each type and kind of pneumatic tire assembly is of readily assemblable and disassemblable construction and comprises a complete pneumatic tire of conventional configuration which is composed of a pneumatic tire body component and one or more annular continuous anti-skid, traction and wearing tread components where the annular continuous anti-skid, traction and wearing tread components forming the edges of the tread width are constructed with sides that extend radially toward the center of the assembly, which can contain a metallic bead or other stabilizing member, and blend with the sidewalls of the pneumatic tire body component presenting a smooth surface while engaging said sidewalls with mutually arranged laterally extending projections and matching indentations, and where all of the annular continuous anti-skid, traction and wearing tread components are intimately attached, connected and locked to its outer circumference and to each other. The plurality of dividing interfaces along which the anti-skid, traction and wearing tread components are attached, connected and locked to the pneumatic tire body components of these pneumatic tire assemblies, and to each other, are interfaces with straight or variously shaped interlocking projections that are an integral part of said interfaces spaced appropriately approximately one or more projection widths apart along said interfaces. The pneumatic tire body component of these pneumatic tire assemblies is constructed so that in its inflated condition its outer circumference and the projections made integral therewith are nearly flat or parallel with its axis of rotation, and each projection extends laterally a suitable distance to engage the formed edge of the hub-side or in some instances the axle-side annular continuous anti-skid, traction and wearing tread component. Each annular continuous anti-skid, traction and wearing tread components of these pneumatic tire assemblies is constructed so that its inner circumference and the projections made integral therewith are nearly flat or parallel with its axis of rotation, and the formed edge of the hub-side or axle-side anti-skid, traction and wearing tread component is indented to accept the laterally extending pneumatic tire body component projections. Each of the projections made integral with the components of these pneumatic tire assemblies is suitably slotted on its outer surface one or more times to a sufficient depth whereby equal, matching and/or alternate projections of any one of the several components and sets of opposing interfaces mesh by the one lateral motion which positions the pneumatic tire body component inside the anti-skid, traction and wearing tread components with their various projections interdigitating along the extent of said opposing interfaces. Each slot in each projection is so designed that when this occurs the slots in the projections of the particular set of said opposing interfaces line up and form a long slot or groove along the extent of each set of said opposing interfaces. Into each of these long grooves a flexible cable can be drawn and detachably anchored or stretched and allowed to retract into the groove under its own tension thus attaching, connecting and locking the annular continuous anti-skid, traction and wearing tread components to the pneumatic tire body component and to each other whereby the anti-skid, traction and wearing tread components are applicable to and removable from the pneumatic tire body component of these pneumatic tire assemblies without deflating or distorting the pneumatic tire body, while the pneumatic tire body in inflated and mounted on the rim of a motor vehicle wheel, and while the wheel on which the pneumatic tire body is inflated and mounted remains attached, connected and locked to the wheel drum and axle assembly of the vehicle on which it serves.

Other objects and advantages will be apparent from the following description when read in connection with the accompanying drawing, in which:

FIGURES 1A and 1B are side elevations showing one half of the side view of two forms of the innumerable types and kinds of pneumatic tire assemblies according to the present invention. The form of these pneumatic tire assemblies on the right, FIGURE 1A, shows the tread component with a formed outer edge which conceals the projection of the components and blends into the side-wall of the pneumatic tire component. The form of these pneumatic tire assemblies on the left, FIGURE 1B, shows the components with straight projections.

FIGURE 2 is a cross-sectional view taken along the line and in the direction of 2—2 of FIGURE 1B showing a form of these pneumatic tire assemblies mounted on the rim of a motor vehicle wheel, shown in phantom lines, with a single tread component attached to a pneumatic tire body component by flexible cables which lie in the grooves formed by the slots in their projections according to the present invention.

FIGURE 3 is a partial side view of the components of these pneumatic tire assemblies with projections smaller in circumferential width at their base widening toward the ends thus forming a dovetail interlocking attachment which is further held secure by flexible cables which lie in the grooves formed by the slots in their projections according to the present invention.

FIGURE 4 is a cross-sectional view taken along the line and in the direction of 4—4 of FIGURE 1A showing a form of these pneumatic tire assemblies mounted on the rim of a motor vehicle wheel, shown in phantom lines, with a single tread component attached to a pneumatic tire body component by a flexible cable which lies in the groove formed by the slots in the projections on one side of the assembly; on the other side the formed edge of the tread component is shown engaging laterally extending projections of the pneumatic tire body component as it blends into said component's side-wall according to the present invention.

FIGURE 5 is a plan view of the tread surface of a form of these pneumatic tire assemblies showing the interdigitating projections of the components aligned on either side of the tread component and flexible cables which lie in the grooves formed by the slots in the projections joining the components according to the present invention.

FIGURE 6 is a partial side view of the components of these pneumatic tire assemblies with projections made in the shape of a T thus forming an interlocking attachment which is further held secure by flexible cables which lie in the grooves formed by the slots in their projections according to the present invention.

FIGURE 7 is a plan view of the tread surface of a form of these pneumatic tire assemblies showing the slots in the interdigitating projections of the components aligned on one side of the tread component with the flexible cable which lies in the groove formed by the slots in the projections and the formed edge of the tread component in this form of these pneumatic tire assemblies according to the present invention.

Referring now more in detail to the drawing wherein similar reference characters identify corresponding parts throughout the several views, there are shown in FIGURES 1A and 1B the outer or hub-side elevation of two forms of the types and kinds of pneumatic tire assemblies described herein. The form of these pneumatic tire assemblies to the right of the view, FIGURE 1A, is divided into two or more components 5 and 6, which consist of one or more annular continuous anti-skid, traction and wearing tread components 5 and a pneumatic tire body component 6. The one or more tread components 5 are assembled over the pneumatic tire body component 6 which is inflated and mounted on rim 28 by sliding them laterally over the outer circumferential surface of the pneumatic tire body component 6. When there is one tread component 5 the projections 12 and 13 mesh over the outer circumference of the pneumatic tire body component 6. The laterally extending portion of projections 13 engage the indentations in the formed edge 10 over bead 11 of the tread component 5. On the axle-side of the assembly the slots 18 in the projections 12 and 13 of the components 5 and 6 come together and form groove 18 into which cable 21 is detachably anchored or stretched and allowed to retract under its own tension. When two or more tread components 5 are used, the axle-side of this form of these pneumatic tire assemblies looks the same as the view seen in FIGURE 1A where laterally extending projections 13 engage indentations in the formed edges 10 over bead 11 which blends into the side-walls of the pneumatic tire body component 6 on both sides, and the tread components 5 are attached, connected and locked to each other and to the pneumatic tire body component 6 when the slots in their projections mesh at interfaces 20 and form a groove or grooves 18 in the tread surface 9. This is accomplished by having the projections 12 of each constituent component 5 made approximately half width at the interface 20 so that they come together or mesh and form a whole projection 12 and the slots 18 of all projections 12 and 13 of components 5 and 6 align in the interfaces 20 to form a groove or grooves 18 into each of which a cable 21 is detachably anchored or stretched and allowed to retract under its own tension.

The form of these pneumatic tire assemblies to the left of the view, FIGURE 1B, is divided into two or more components 7 and 8 which consist of one or more annular continuous anti-skid, traction and wearing tread components 7 and a pneumatic tire body component 8. The one or more tread components 7 are assembled over the pneumatic tire body component 8 which is inflated and mounted on rim 28 by sliding them laterally over the outer circumferential surface of the pneumatic tire body component 8. When there is one tread component 7 the projections 22 and 23 or 14 and 15 or 16 and 17 mesh over the outer circumference of the pneumatic tire body component 8. Alignment of the components causes the two slots 18 in the projections 22 and 23 or 14 and 15 or 16 and 17 to come together to form grooves 18 into each of which a cable 21 is detachably anchored or stretched and allowed to retract under its own tension. When two or more tread components are used the tread components 7 are attached, connected and locked to each other and to the pneumatic tire body component 8 when the slots 18 in their projections mesh at interfaces 20 and form grooves 18 in the tread surface 9 as well as at the edges of said surface 9 as shown. This is accomplished by having the projections 22 or 14 or 16 of each constituent component 7 made approximately half width at interfaces 20 in the tread surface 9 so that they come together or mesh to form a whole projection 22 or 14 or 16 and the slots 18 of all projections 22 and 23 or 14 and 15 or 16 and 17 of components 7 and 8 in the interfaces 20 align to form grooves 18 into each of which a cable 21 is detachably anchored or stretched and allowed to retract under its own tension.

The form of these pneumatic tire assemblies shown in FIGURE 2 is a cross-sectional view of the form of these pneumatic tire assemblies shown in side elevation in FIGURE 1B where the projection 23 of the pneumatic tire body component 8 is shown in full view and the projection 22 of the tread component 7 is shown in phantom. The slots 18 of both components 7 and 8 are shown aligned to form grooves 18 on either side of the tread surface 9 and cables 21 are shown lying in grooves 18 holding the components 7 and 8 together at interface 20.

The form of these pneumatic tire assemblies shown in FIGURE 3 is a partial side elevation revealing a dovetail interlock assembly where projections 14 and 15 of tread and pneumatic tire body components 5 and 6 or 7 and 8 when assembled by sliding them together laterally resist radial separation along the extent of their contact. The ends of cable 21 are shown extending from groove 18 formed when slots 18 in the projections 14 and 15 align.

The form of these pneumatic tire assemblies shown in FIGURE 4 is a cross-sectional view of the form of these pneumatic tire assemblies shown in side elevation in FIGURE 1A where the projection 12 of the tread component 5 is shown in full view and the projection 13 of the pneumatic tire body component 6 is shown in phantom. The laterally extending portion of projection 13 of the pneumatic tire body component 6 is shown engaging the indentation in the formed edge 10 over bead 11 of the tread component 5 and the slots 18 of both components 5 and 6 are shown aligned to form groove 18 on the axle-side of the assembly and cable 21 is shown lying in groove 18 holding the components 5 and 6 together at interface 20.

The form of these pneumatic tire assemblies shown in FIGURE 5 shows a plan view of the tread surface 9 of the form of these pneumatic tire assemblies shown in side elevation in FIGURE 1B. The projections 22 and 23 of tread and pneumatic tire body components 7 and 8 are shown aligned over interface 20. The cables 21 are shown lying in the grooves 18 formed by the slots 18 in the projections 22 and 23 of the tread component 7 and the pneumatic tire body component 8.

The form of these pneumatic tire assemblies shown in FIGURE 6 is a partial side elevation revealing a T-shaped interlock assembly where projections 16 and 17 of tread and pneumatic tire body components 5 and 6 or 7 and 8 when assembled by sliding them together laterally resist radial separation along the extent of their contact. The ends of cable 21 are shown extending from groove 18 formed when slots 18 in the projections align.

The form of these pneumatic tire assemblies shown in FIGURE 7 is a plan view of the tread surface 9 of the form of these pneumatic tire assemblies shown in side elevation in FIGURE 1A. The projections 12 and 13 of tread and pneumatic tire body components 5 and 6 are shown aligned over interface 20. The laterally extending portion of projections 13 engages the indentations in the formed edge 10 of tread component 5 containing bead 11 as edge 10 is shown blending smoothly into the side-wall of pneumatic tire body component 6 and the cable 21 is shown lying in groove 18 formed by the slots 18 in the projections 12 and 13 of the tread component 5 and the pneumatic tire body component 6.

It is therefore clear that the present invention provides all types and kinds of pneumatic tire assemblies of which each type and kind of assembly is of readily assemblable and disassemblable construction and comprises a complete pneumatic tire of conventional configuration composed of a pneumatic tire body component and one or more annular continuous anti-skid, traction and wearing tread components intimately attached, connected and locked to each other and to the outer circumference of the pneumatic tire body component so that they are readily variable, renewable and replaceable without deflating or distorting the pneumatic tire body component, while the pneumatic tire body component is inflated and mounted on the rim of a motor vehicle wheel, and while the wheel on which the pneumatic tire body component is inflated and mounted remains attached, connected and locked to the wheel drum and axle assembly of the vehicle on which it serves.

The intent of this invention is to make known the possibility of possessing the pneumatic tire assemblies according to the present invention which are the ultimate in the development of pneumatic tires of conventional configuration in that they provide separation of the tread material and the pneumatic tire body. The tread can be varied, renewed and replaced with ease. The pneumatic tire body can be made a permanent part of the motor vehicle assembly in that it can be made puncture proof and blow-out proof without the usable life of these features being dependent on tread life, and it need never be deflated. A few of the results made possible by this invention are that the need to supply a spare tire on a fifth wheel on the equipment lists of new motor vehicles will no longer be necessary. Commercial air-lines who retread airplane tire bodies an average of seven times before purchasing new tires for their planes can know they are giving extra care and providing safe landing tread on tires that need never be weakened by heating for retreading. Commercial bus-lines who retread pneumatic tire bodies an average of twelve times, the trucking and cab industries who have found multiple retreading an absolute must for economical operation, owners of earth movers with their massive tires, and owners of small compact and foreign tires which create more wear per tire-mile, will find some advantages in these pneumatic tire assemblies.

These disclosures and descriptions of construction features relied upon to facilitate the claims hereinafter made shall be construed also to cover construction where an intermediate member or members are introduced between the interfaces so described so that the projections made integral with the components of these pneumatic tire assemblies mesh and interdigitate not with each other but with the projections made integral with said intermediate member or members which are then detachably anchored or held by their own tension between the components of these pneumatic tire assemblies. It is furthermore understood that variations in the present disclosure as to size, integration, resilient material, location and cooperation of parts; for instance, the provision of more than one slot on the projections or the provision of adjustable clamps, hooks and anchors, to accommodate small variations in size; may all be resorted to in order to provide the most suitable version of the disclosure, to provide for a special use or to exploit the advantages of new materials, without departing from the spirit of the present invention and the scope of the appended claims.

It is claimed and desired to obtain by Letters Patent of the United States:

1. A pneumatic tire assembly of readily assemblable and disassemblable construction comprising a complete pneumatic tire of conventional configuration composed of a pneumatic tire body component and one or more annular continuous anti-skid, traction and wearing tread components intimately attached, connected and locked to each other, all components having a plurality of dividing interfaces with variously shaped integral interlocking projections spaced approximately one or more projection widths apart along said interfaces, said components being constructed so that in the inflated and mounted condition of the pneumatic tire body component its outer circumference and the projections integral therewith are nearly flat or parallel with its axis of rotation and the inner circumference and the projections made integral therewith of each annular continuous anti-skid, traction and wearing tread component are nearly flat or parallel with its axis of rotation, each of the projections made integral with the components being suitably slotted on its outer surface at least one time to a sufficient depth whereby equal, matching and alternate variously shaped projections of any one of said components and sets of opposing interfaces mesh by the one lateral motion which positions the pneumatic tire body component inside the anti-skid, traction and wearing tread component with their various projections interdigitating along the extent of said opposing interfaces and each slot in each projection being so designed that when this occurs said slots in the projections of a particular set of said opposing interfaces line up and form a long slot or groove along the extent of each set of said opposing interfaces into each of which long grooves a flexible cable can be drawn and detachably anchored or stretched and allowed to retract into the groove under its own tension whereby the one or more annular continuous anti-skid, traction and wearing tread components are applicable in an attached, connected and locked condition to and removable, after being unlocked, in a free uncomplicated manner from the pneumatic tire body component by one lateral motion, in each instance, without deflating or distorting the pneumatic tire body component.

2. A pneumatic tire assembly of readily assemblable and disassemblable construction comprising a complete pneumatic tire of conventional configuration as set forth in claim 1 wherein the annular continuous anti-skid, traction and wearing tread components forming the edges of the tread width are constructed with sides that extend radially toward the center of the assembly, said sides blending with the sidewalls of the pneumatic tire body component and engaging said sidewalls with mutually arranged laterally extending projections and matching indentations.

References Cited in the file of this patent

UNITED STATES PATENTS

| | | |
|---|---|---|
| 1,265,556 | Varner | May 7, 1918 |
| 1,328,054 | Nicholson | Jan. 13, 1920 |
| 2,957,509 | Johnson | Oct. 25, 1960 |

FOREIGN PATENTS

| | | |
|---|---|---|
| 245,356 | Great Britain | Jan. 7, 1926 |
| 256,595 | Italy | Aug. 5, 1928 |